(12) United States Patent
Shaw et al.

(10) Patent No.: US 8,499,823 B1
(45) Date of Patent: Aug. 6, 2013

(54) TWIN HEAT TRANSFER TUBING RETENTION PANEL

(75) Inventors: Todd Shaw, Mount Sinai, NY (US); Frank Bilotta, Mount Sinai, NY (US)

(73) Assignee: One Source, Mount Sinai, NY (US)

( * ) Notice: Subject to any disclaimer, the term of this patent is extended or adjusted under 35 U.S.C. 154(b) by 1510 days.

(21) Appl. No.: 12/148,332

(22) Filed: Apr. 18, 2008

(51) Int. Cl.
*F24H 9/06* (2006.01)
*F24D 3/16* (2006.01)
*F28F 9/00* (2006.01)
*F28F 1/32* (2006.01)

(52) U.S. Cl.
USPC .............. 165/53; 165/49; 165/56; 165/67; 165/171; 237/69

(58) Field of Classification Search
USPC .............. 165/45, 49, 53, 55, 56, 67, 69, 168, 165/171, 183; 237/69
See application file for complete search history.

(56) References Cited

U.S. PATENT DOCUMENTS

| | | | | |
|---|---|---|---|---|
| 2,480,427 A * | 8/1949 | Stanton | ............. | 165/56 |
| 2,734,259 A * | 2/1956 | Beck | ............. | 165/168 |
| 2,799,481 A * | 7/1957 | Becker | ............. | 165/171 |
| 2,823,903 A * | 2/1958 | Collins | ............. | 165/67 |
| 2,919,117 A * | 12/1959 | Hoffman | ............. | 165/56 |
| 3,037,746 A | 6/1962 | Williams | | |
| 3,319,708 A * | 5/1967 | Nelson | ............. | 165/55 |
| 3,366,170 A | 1/1968 | Welz | | |
| 4,576,221 A | 3/1986 | Fennesz | | |
| 4,646,814 A * | 3/1987 | Fennesz | ............. | 165/56 |
| 4,779,673 A | 10/1988 | Chiles et al. | | |
| 4,865,120 A * | 9/1989 | Shiroki | ............. | 165/56 |
| 4,911,353 A | 3/1990 | Deakin | | |
| 5,078,203 A * | 1/1992 | Shiroki | ............. | 165/56 |
| 5,454,428 A | 10/1995 | Pickard et al. | | |
| 5,497,826 A | 3/1996 | Ingram | | |
| 5,579,996 A | 12/1996 | Fiedrich | | |
| 5,740,858 A | 4/1998 | Ingram | | |
| 5,743,330 A * | 4/1998 | Bilotta et al. | ............. | 165/171 |
| 5,799,723 A | 9/1998 | Sokolean | | |
| 5,931,381 A | 8/1999 | Fiedrich | | |
| 6,092,587 A | 7/2000 | Ingram | | |
| 6,251,495 B1 | 6/2001 | Wilson et al. | | |
| 6,283,382 B1 | 9/2001 | Fitzemeyer | | |
| 6,533,185 B1 | 3/2003 | Muir | | |
| 6,800,352 B1 | 10/2004 | Hejna et al. | | |
| 6,910,526 B1 * | 6/2005 | Sokolean | ............. | 165/56 |
| 7,021,372 B2 | 4/2006 | Pickaro | | |
| 7,992,623 B2 * | 8/2011 | Keller | ............. | 165/53 |
| 8,025,240 B2 * | 9/2011 | Keller | ............. | 237/69 |

FOREIGN PATENT DOCUMENTS

WO 00/32991 8/2000

* cited by examiner

*Primary Examiner* — Ljiljana Ciric
(74) *Attorney, Agent, or Firm* — Dilworth & Barrese, LLP (57) ABSTRACT

A radiant heating panel has a receptacle for heat transfer tubing and divided into immediately-adjacent tracks, each for receiving respective heat transfer tubing, and with a partition extending between the immediately-adjacent tracks and defining a wall therebetween.

15 Claims, 7 Drawing Sheets

TWIN HEAT TRANSFER TUBING RETENTION PANEL

BACKGROUND OF THE INVENTION

The present invention is directed a panel for supporting at least two parallel tubing carrying fluid, e.g., radiant heat transfer medium. More particularly, the present invention is directed to such a panel capable of securely supporting the adjacent tubing thereon in a stable, versatile mariner to facilitate heat transfer between fluid flowing through the adjacent tubing and out to supporting structure. As used herein, the term "heat transfer" encompasses heat exchange for both heating and cooling purposes. For example, the heat transfer tubing can carry heating fluid such as water or cooling/refrigeration fluid such as Freon ($CCl_3F$).

Numerous types of structures for retaining heat transfer tubing on floors, walls, ceilings, etc. are disclosed, e.g., in U.S. Pat. Nos. 7,021,372; 6,533,185; 5,579,996; and 6,283,382. U.S. Pat. Nos. 6,800,352; 6,251,495 disclose utilizing a radiant heat barrier to reduce unwanted heat transmission in a particular direction. U.S. Pat. Nos. 6,092,587; 5,740,858 and 5,497,826 show heating/cooling systems having panels with very specific arrangement of both supporting channels for heat transfer tubing and heat barrier layer. U.S. Pat. No. 5,743,330, the contents of which are incorporated by reference herein, discloses a panel for supporting heat transfer tubing and having a tube-receiving track with a multi-faceted inner surface. U.S. application Ser. No. 11/528,171, the contents of which are also incorporated by reference herein, is directed to, among other features, improving interlocking between adjacent panels supporting heat transfer tubing.

However, all these references, in addition to U.S. Pat. Nos. 5,743,330 and 5,454,428, are directed to just supporting a single heat transfer tubing upon respective panels or structure. There is no indication of supporting a plurality of heat transfer tubing upon such structure, namely supporting such tubing adjacent one another to facilitate heat transfer between fluid flowing through the adjacent tubing and out to the supporting structure.

SUMMARY OF THE INVENTION

Accordingly, it is an object of the present invention to improve heat transfer such as heating or cooling.

It is a more specific object of the present invention to facilitate heat transfer between fluid flowing through adjacent tubing and out to a supporting structure.

It is a further object of the present invention to facilitate supporting of heat transfer tubing of different size upon a single supporting structure.

These and other objects are attained by the present invention which is directed to a radiant heating panel having a receptacle for heat transfer tubing, with the receptacle being divided into at least two separate tracks for each receiving respective heat transfer tubing, and with a partition extending between the two adjacent tracks. Two fins are preferably mounted upon the outer surface of this receptacle and extend in opposite directions to enhance conduction of radiant heat. A pair of extensions is additionally provided on respective ends of the receptacle to flare outwardly, thereby facilitating inserting heat transfer tubing into the respective tracks.

More particularly, the partition extending between the adjacent tracks has a diamond-shaped cross-section at an outer end thereof to facilitate insertion of the tubing. While the tracks may have identical size, shape and cross-section, the tracks can have different cross-section to accommodate tubing of different size. In this instance, the outer end of the partition may have zig-zag cross-section, with a convexity facing the larger track and concavity facing the smaller track, to facilitate insertion of tubing of respective size. Additionally, more than two tracks can be provided, e.g., four tracks, of the same or varying size, and with the same or different partitions provided therebetween.

Fluid can flow through the adjacent tubing in the same or opposite directions, to facilitate heat transfer between and ultimately out to the supporting panel, as required. As heating fluid flows through a single tubing and passes from panel to panel, a temperature differential occurs as heat energy is conducted to subsequent panel, resulting in higher initial temperature and greater heat transfer occurring at the first such radiant panel and continually lower temperature and lessening heat transfer at the subsequent panels.

However, it has now been found possible to increase both amount and uniformity of heat transfer along all the arranged heat panels without regard to sequence, thereby improving heat transfer into surrounding buildings and structures. More particularly, effectiveness of heat transfer between the panel and building structure (floor, wall, or ceiling) is improved by incorporating multiple tube-receiving tracks adjacent one another to enhance both tube-receiving capacity and heat transfer effectiveness. In this regard, the multiple tube-receiving tracks can be of varying dimensions to accommodate either equivalent or different size of readily-available heat transfer tubing.

It is believed this improvement is attained by, among other features, enhanced heat transfer between fluid closely flowing in adjacently-positioned tubing. Unlike the prevailing state of the art, (1) the same heat exchange output can be maintained with lower temperature of the heat transfer fluid, (2) increased heat exchange output is attained at the same fluid (water) temperature, (3) uniform heat exchange is achieve along all panels in the arranged system by circulating the heat exchange fluid in opposite directions or counter-flow pattern along adjacent tubing, (4) a multiple of heat transfer tubing can be adjacently-arranged and supported for a variety of flow directions of heat transfer fluid, and (5) different sizes of heat transfer tubing can be accommodated within a single heat transfer panel.

The heat transfer panel can be constructed of any feasible material providing effective heat transfer such as aluminum or other metals, and can have any width, height and length as required, including any number of tubing-receiving tracks. Panel dimensions and quantity of tubing-receiving tracks are determined to accommodate the overall desired heat transfer, building structure requirements, and uniformity of heat transfer required.

BRIEF DESCRIPTION OF THE DRAWINGS

The present invention will be described in further detail with reference to the accompanying drawings, in which.

DESCRIPTION OF THE PREFERRED EMBODIMENTS

Figure 1:
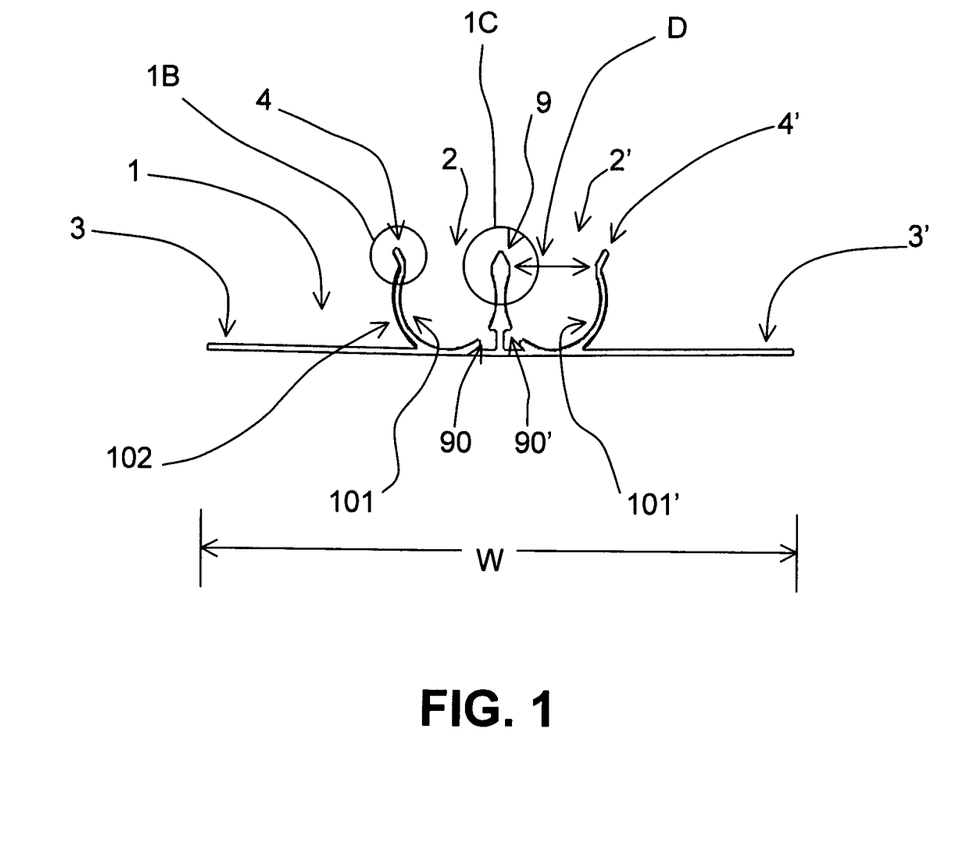
FIG. 1 illustrates a sectional view of one embodiment of a radiant heating panel for receiving heat transfer tubing in accordance with the present invention.

Referring to the drawings, an elongated heat transfer panel 1 is illustrated, in section, in FIG. 1. The panel 1 comprises a receptacle containing two separate tracks 2, 2', each having inner and outer surfaces 101, 101' and 102 respectively. Two fins 3, 3' are integrally formed upon the outer surfaces 102 of the tracks 2, 2', i.e., the receptacle and extend at an approximately 180° angle with respect to one another, i.e., extend oppositely away from one another, as illustrated. Extensions 4, 4' are also integrally mounted upon the top ends of the outer surfaces 102 of the receptacle and flare outwardly from the respective tracks 2,2', thus facilitating insertion of heat transfer tubing 6 into the respective tracks as illustrated, e.g., in FIGS. 1A and 5.

Figure 1A:
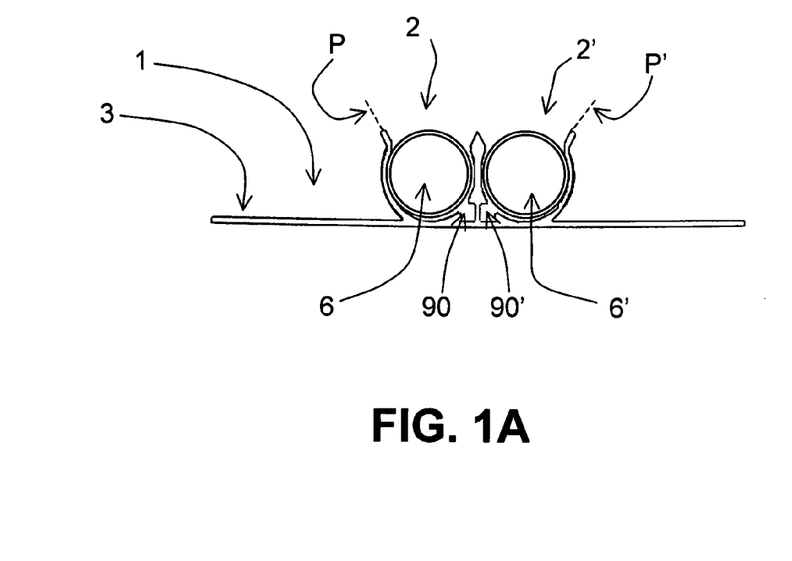
FIG. 1A illustrates a sectional view similar to FIG. 1 and showing heat transfer tubing received by the radiant heating panel.
Figure 1B:
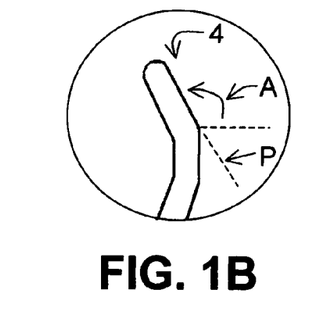
FIG. 1B illustrates an enlarged view of the encircled area 1B in FIG. 1.
Figure 1C:
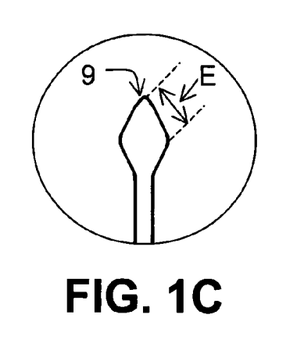
FIG. 1C illustrates an enlarged view of the encircled area 1C in FIG. 1.

A partition 9 extends upwardly between the two tracks 2, 2' to separate and define the same, together with defining part of the respective inner surfaces 101, 101' of the tracks. In the embodiment illustrated in FIGS. 1, 1A and 1C, this partition 9 has a diamond-shaped cross-section at a top end when viewed in a longitudinal direction along the respective adjacent tracks 2, 2', to facilitate insertion of the heat transfer tubing 6 into the respective tracks 2, 2'. More specifically, as shown in FIG. 1A, heat transfer tubing 6 can be inserted, e.g, snapped into the respective tracks 2, 2' and will be securely retained therein because a distance D between inner points of respective extensions 4, 4' and diamond-shaped cross-section of the partition 9 is narrower than outer diameter of the heat transfer tubing. Each track 2, 2' is shaped to have a substantially circular recess with an upper opening to receive the heat transfer tubing 6 forming a circular arc about the tubing 6 when received therein as shown, e.g., in FIG. 1A with tight, heat-conductive fit.

The tracks 2, 2' are shaped to surround approximately 55-75% of the circumference of the heat transfer tubing secured therein as shown in FIG. 1A, preferably about 65% of the circumference of the heat transfer tubing. Recesses or cutouts 90 are provided in the inner base corners of tracks 2, 2' adjacent partition 9 to conserve material (i.e., it is unnecessary to provide inner surfaces 101 and 101' of tracks 2, 2' with a continuously circular inner circumference to securely receive and retain heat transfer tubing therein, as illustrated in FIG. 1A).

In a preferred embodiment, distance D is approximately 0.450 in. to 0.575 in., with the angle A made by extensions 4, 4' with respect to the horizontal approximately 125 degrees to 145 degrees. Additionally, an edge E of this diamond-shaped cross-section at the tip of partition 9 is approximately 0.03 in. to 0.06 in. in length (all four edges E are approximately the same length). The tracks 2, 2' themselves have an inner radius of approximately 0.250 in. to 0.313 in. to accommodate heat transfer tubing 6 having an outer diameter of approximately 0.500 in. to 0.625 in. Length W between the edges of fins 3, 3' as shown, are approximately 3.50 in. to 0.450 in. More specifically, the inner diameters of the respective tracks 2, 2' are dimensioned to approximately equal the outer diameters of the respective heat transfer tubing 6 or at most, exceed the outer diameters of the heat transfer tubing by about 0.005 in. Additionally, inner planes P of the outer extensions 4, 4' generally face each other at an angle of approximately 90°.

Figure 2:
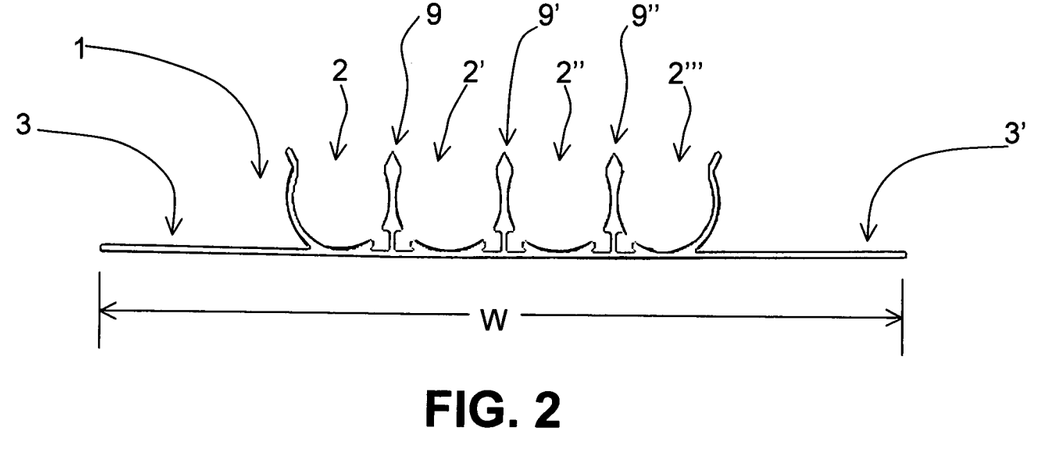
FIG. 2 illustrates a sectional view of another embodiment of a radiant heating panel for receiving heat transfer tubing in accordance with the present invention.

FIGS. 1, 1A, 1B and 1C illustrate an embodiment of the present invention having two adjacent tracks 2, 2' of substantially same size and configuration. However, variations of this embodiment fall within the scope of the present invention. For example, more than two tracks 2,2' can be incorporated into the new and improved panel herein. FIG. 2, for example, illustrates and embodiment having four such tracks 2, 2', 2" and 2'" separated by three respective partitions 9, 9' and 9". The length W between the edges of the fins 3 can remain the same as in FIGS. 1 and 1A, with the other dimensions and angles remaining the same.

Figure 3:
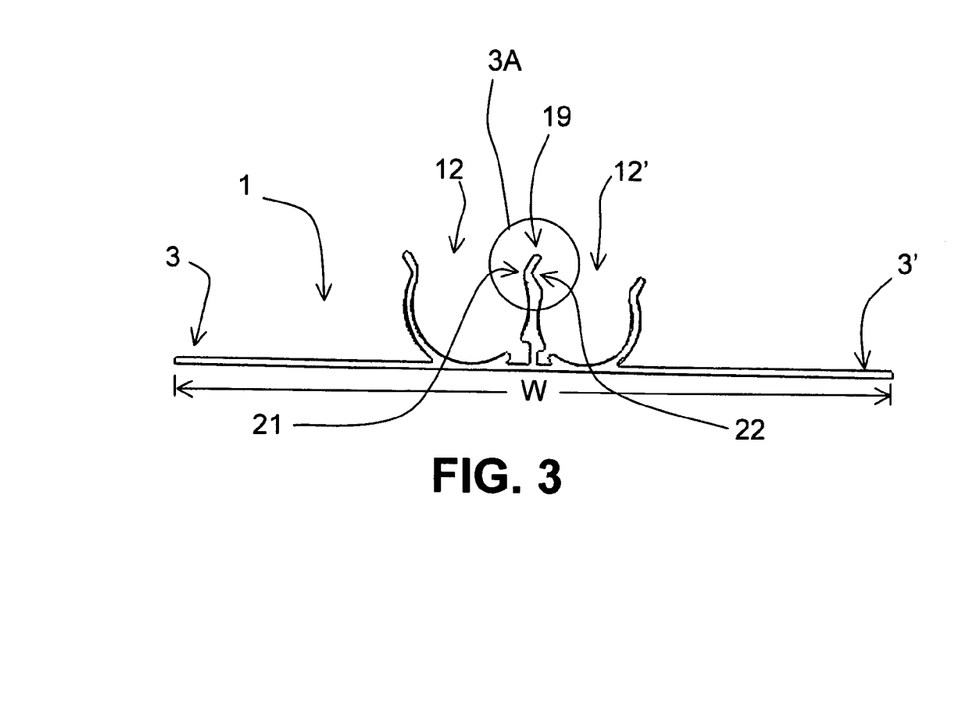
FIG. 3 illustrates a sectional view of a further embodiment of a radiant heating panel for receiving heat transfer tubing in accordance with the present invention.
Figure 3A:
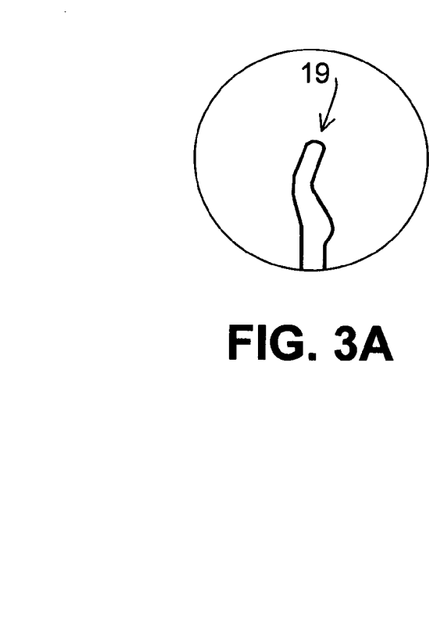
FIG. 3A illustrates an enlarged view of the encircled area 3A in FIG. 3.

FIG. 3 illustrates a further embodiment in which the adjacent tracks 12, 12' differ in size, i.e., possess different radii, and the partition 19 possesses an asymmetrical cross-section at the outer or top end thereof, when viewed in the longitudinal direction along the tracks 12, 12'. More specifically, this outer or top end of the partition possesses 19 a zig-zag cross-section as illustrated, oriented to have a convexity 21 facing the track 12 of larger size or dimension and a concavity 22 facing the track 12' of smaller size or dimension. Thus the panel shown in FIG. 3 can accommodate heat transfer tubing of different size adjacent one another to facilitate heat delivery e.g., in the case where different fluid might be flowing in adjacent tubing at different rate, or availability of heat transfer tubing of differing size. The length W between the edges of the fins 3, 3' can also remain the same as in FIGS. 1, 1A and 2, with the other dimensions and angles remaining the same.

In the embodiment illustrated in FIG. 3, the convexity 21 has a radius of curvature of approximately 0.450 to 0.490 while the concavity 22 has a radius of curvature of approximately 0.180 to 0.220 on partition 19. Additionally, larger track 12 has an inner radius of approximately 0.310 in. to 0.330 in. while smaller track 12' has an inner radius of approximately 0.250 in. to 0.265 in. All other dimensions can remain the same as in the embodiments illustrated in FIGS. 1 and 2.

Figure 4:
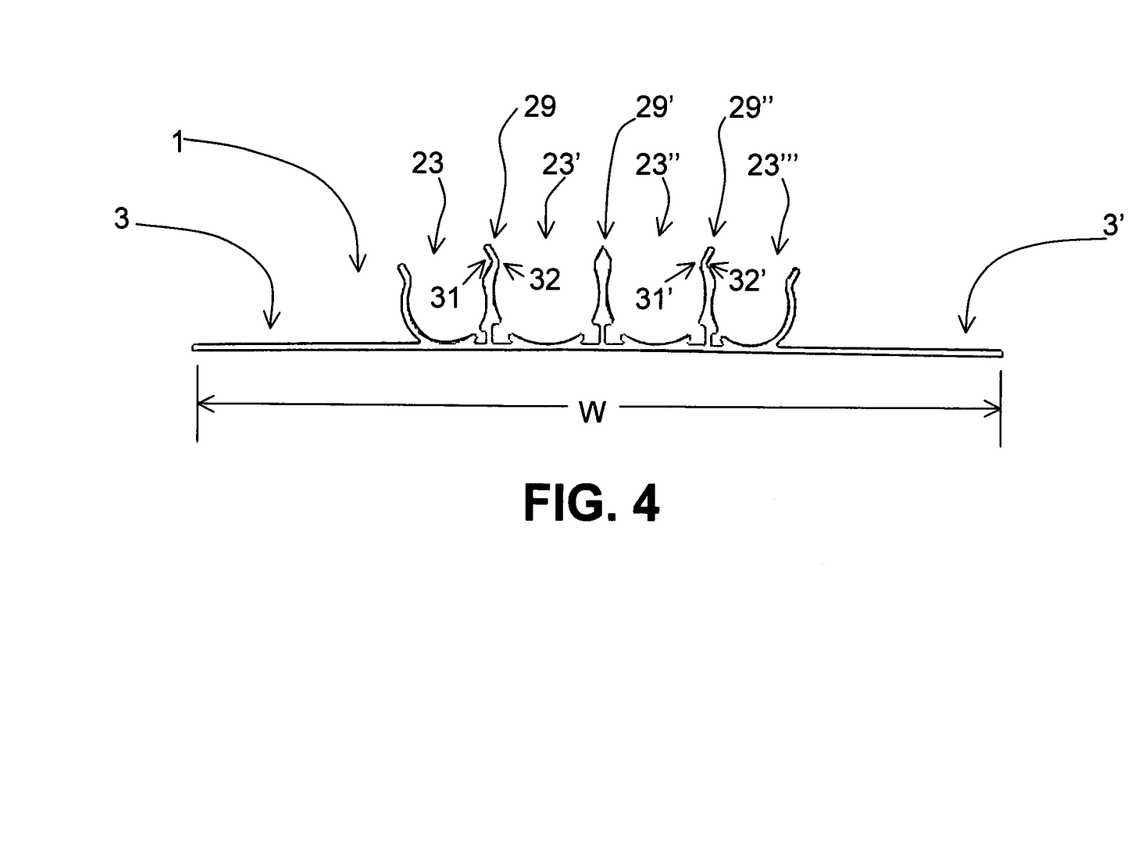
FIG. 4 illustrates a sectional view of still another embodiment of a radiant heating panel for receiving heat transfer tubing in accordance with the present invention.

FIG. 4 illustrates an embodiment essentially combining the features of the embodiments of FIGS. 2 and 3 supra, namely four tracks 23, 23', 23" and 23'", with the two inner tracks 23' and 23" having the same size and shape to one another and which is larger than the size and shape of the two outer track 23 and 23'" which also have the same size and shape to one another. In the embodiment illustrated in FIG. 4, the center partition 29' possesses the diamond-shaped cross-section at the top end thereof, while the two outer partitions 29 and 29" each possess zig-zag cross-section with the respective convexities 31, 31' oriented towards the large inner tracks 23', 23"

and the respective concavities 32, 32' oriented toward the outer smaller tracks 23, 23'''. The length W between the edges of the fins 3, 3' can remain the same as in FIGS. 1, 2 and 3, with the other dimensions and angles remaining the same.

Figure 5:
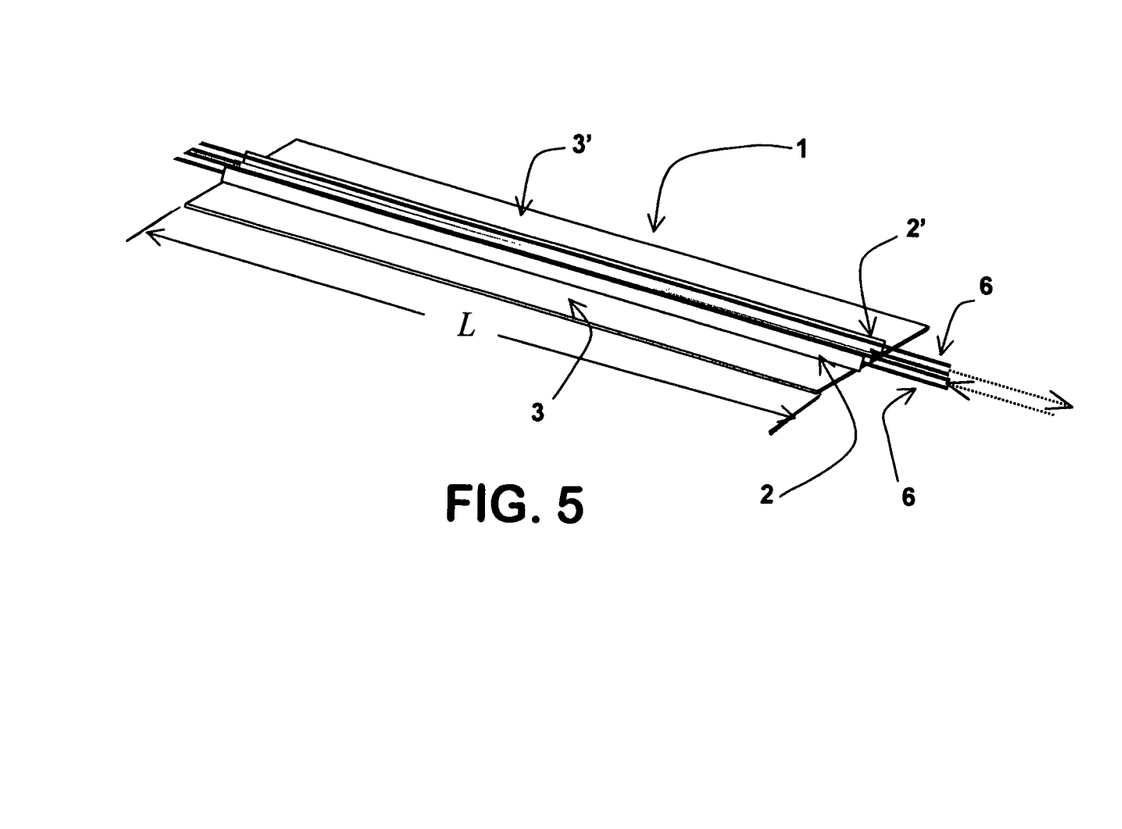
FIG. 5 illustrates a schematic perspective view of the radiant heating panel receiving the heat transfer tubing as shown in FIG. 1A and schematically illustrating flow of heating fluid through the respective tubing in accordance with the present invention.

FIG. 5 illustrates one example of the present invention in which fluid flow can be directed in opposite directions through adjacent heat transfer tubing 6. This facilitates heat exchange between adjacent tubing 6. For example, heated fluid might flow through one of the heat transfer tubing 6, with heat then transferred, by conduction to presently unheated fluid flowing through adjacent tubing, greatly enhancing versatility of the heating panels. In the embodiment shown in FIG. 5, the length L of the radiant heating panel in the direction of fluid flow (perpendicular to distance W between the ends of the fins 3, 3' is approximately 48 in. to 96 in.

The heating panels are constructed from material facilitating transfer of heat between fluid flowing in adjacent tubing, e.g., aluminum, with the heat transfer tubing itself being constructed from metal or metallic material such as copper, or from plastic such as polyehtylene, polybutylene, polyvinyl alcohol and copolymers of any of the same. Especially preferred material is cross-linked polyethylene.

Figure 6:
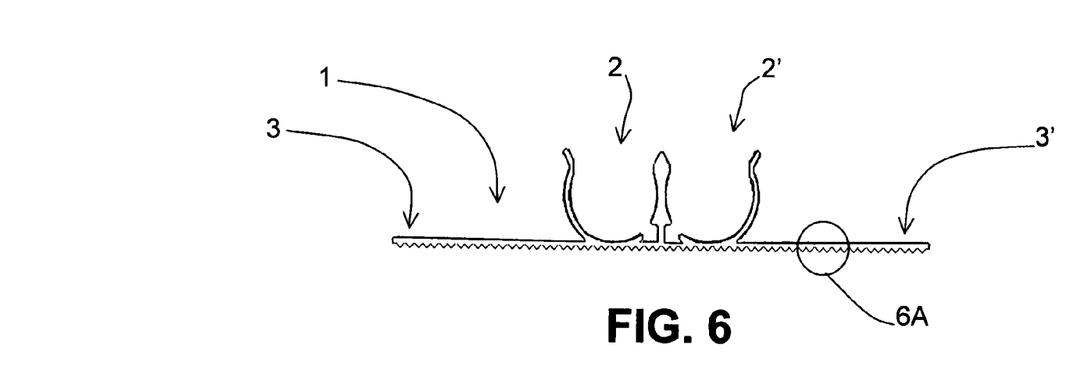
FIG. 6 illustrates an alternative embodiment of the radiant heating panel illustrated in FIG. 1, in which the surface opposite the tracks is multi-faceted.
Figure 6A:
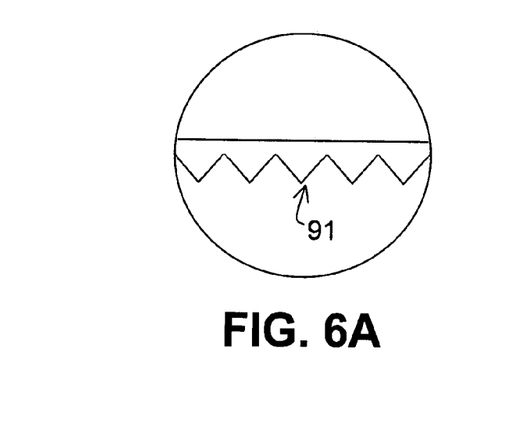
FIG. 6A illustrates an enlarged view of the encircled area 6A in FIG. 6.

The heat transfer panels can be installed into structure as disclosed, e.g., in U.S. Pat. No. 5,743,330 and U.S. application Ser. No. 11/528,171. FIG. 6 illustrates an alternative embodiment of the present invention, in which a surface of the fins 3, 3' facing away from the respective tracks 2, 2' is multi-faceted, e.g., comprising "sawteeth" 91, to also enhance heat conduction to the surrounding environment.

The preceding description of the present invention is merely exemplary and not intended to limit the scope thereof in any way.

What is claimed is:

1. A radiant heating panel comprising
a receptacle for heat transfer tubing,
said receptacle being divided into at least two separate and immediately-adjacent tracks, each track for receiving respective heat transfer tubing,
with a portion of said at least two immediately-adjacent tracks forming a partition which extends directly between two of said at least two immediately-adjacent tracks and defines a mutual wall of said two immediately-adjacent tracks, and
additionally comprising at least one fin mounted upon an outer surface of said receptacle.

2. The panel of claim 1, additionally comprising another fin, such that said at least one fin and said another fin are mounted upon the outer surface of said receptacle extending in substantially opposite directions from one another.

3. The panel of claim 2, wherein surfaces of said at least one fin and another fin facing away from said receptacle are multifaceted.

4. The panel of claim 1, wherein said partition comprises an asymmetrical cross-section at an outer end of said partition when viewed in a longitudinal direction along adjacent tracks, to facilitate insertion of heat transfer tubing into adjacent tracks having different shapes and/or dimensions.

5. The panel of claim 4, wherein the outer end of said partition comprises a zigzag cross-section when viewed in the longitudinal direction.

6. The panel of claim 4, wherein said zigzag cross-section is oriented to have a convexity facing a track of larger shape and/or dimension and concavity facing the track of smaller shape and dimensions.

7. The panel of claim 6, wherein said receptacle comprises four tracks and three partitions,
with a central partition comprising a diamond-shaped cross-section at an outer end of said central partition when viewed in a longitudinal direction along adjacent tracks, and
two outer partitions each comprising a zigzag cross-section when viewed in the longitudinal direction,
to facilitate insertion of the heat transfer tubing into the respective tracks.

8. The panel of claim 7, wherein
two inner tracks have a larger shape and/or dimension than two immediately-adjacent outer tracks.

9. The panel of claim 1, wherein a surface of said at least one fin facing away from said receptacle is multifaceted.

10. The panel of claim 1, wherein said partition comprises a diamond-shaped cross-section at an outer end of said partition when viewed in a longitudinal direction along said at least two immediately-adjacent tracks, to facilitate insertion of the heat transfer tubing into the respective at least two immediately-adjacent tracks.

11. The panel of claim 10, wherein said receptacle comprises four tracks and three partitions arranged such that each partition extends directly between two immediately-adjacent tracks and defines a mutual wall of said two immediately-adjacent tracks.

12. A radiant heating panel comprising
a receptacle for heat transfer tubing,
said receptacle being divided into at least two separate and immediately-adjacent tracks, each track for receiving respective heat transfer tubing,
with a portion of said at least two immediately-adjacent tracks forming a partition which extends directly between two of said immediately-adjacent tracks and defines a mutual wall of said two immediately adjacent tracks, and
additionally comprising a pair of extensions mounted upon respective ends of an outer surface of said receptacle and arranged to flare outwardly away from said receptacle and thereby facilitate insertion of the heat transfer tubing into the respective immediately-adjacent tracks.

13. The panel of claim 12, wherein said partition comprises a diamond-shaped cross-section at an outer end of said partition when viewed in a longitudinal direction along said at least two immediately-adjacent tracks, to facilitate insertion of the heat transfer tubing into the respective immediately-adjacent tracks.

14. The panel of claim 13, wherein said receptacle comprises four tracks and three partitions arranged such that each partition extends directly between two immediately-adjacent tracks and defines a mutual wall of said two immediately-adjacent tracks.

15. The panel of claim 12, wherein said partition comprises an asymmetrical cross-section at an outer end of said partition when viewed in a longitudinal direction along adjacent tracks, to facilitate insertion of heat transfer tubing into adjacent tracks having different shape and/or dimensions.

* * * * *